US008930058B1

(12) United States Patent
Quist et al.

(10) Patent No.: US 8,930,058 B1
(45) Date of Patent: Jan. 6, 2015

(54) SYSTEM AND METHOD FOR CONTROLLING A VEHICLE TRAVELING ALONG A PATH (75) Inventors: Donald G. Quist, Ridgecrest, CA (US); David Reed Robinson, Ridgecrest, CA (US); Carl M. Zorzi, Ridgecrest, CA (US); Brian J. Wolfe, Ridgecrest, CA (US); William S. Wight, Ridgecrest, CA (US); Joseph R. Hansen, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 1447 days.

(21) Appl. No.: 12/254,514

(22) Filed: Oct. 20, 2008

(51) Int. Cl.
G05D 1/02 (2006.01)

(52) U.S. Cl.
CPC ............ *G05D 1/0212* (2013.01); *G05D 1/0221* (2013.01); *Y10S 901/01* (2013.01)
USPC .................... 701/23; 701/24; 701/25; 701/26; 901/1; 318/568.13; 318/568.14

(58) Field of Classification Search
USPC ........... 701/2, 23–28, 70, 400, 408–410, 412, 701/466–468, 472, 500; 340/988, 989, 340/995.19, 995.25; 901/1
See application file for complete search history.

(56) References Cited

U.S. PATENT DOCUMENTS

| | | | | | |
|---|---|---|---|---|---|
| 5,448,479 | A | * | 9/1995 | Kemner et al. | 701/23 |
| 5,838,562 | A | * | 11/1998 | Gudat et al. | 701/23 |
| 6,122,572 | A | * | 9/2000 | Yavnai | 701/23 |
| 6,134,486 | A | * | 10/2000 | Kanayama | 701/23 |
| 6,151,539 | A | * | 11/2000 | Bergholz et al. | 701/25 |
| 7,974,738 | B2 | * | 7/2011 | Bruemmer et al. | 700/255 |
| 8,108,138 | B2 | * | 1/2012 | Bruce et al. | 701/420 |
| 2005/0004723 | A1 | * | 1/2005 | Duggan et al. | 701/24 |
| 2006/0074557 | A1 | * | 4/2006 | Mulligan et al. | 701/213 |
| 2007/0198145 | A1 | * | 8/2007 | Norris et al. | 701/23 |
| 2007/0219720 | A1 | * | 9/2007 | Trepagnier et al. | 701/300 |
| 2008/0059015 | A1 | * | 3/2008 | Whittaker et al. | 701/23 |
| 2008/0294288 | A1 | * | 11/2008 | Yamauchi | 700/258 |
| 2009/0088916 | A1 | * | 4/2009 | Elgersma et al. | 701/23 |
| 2009/0276105 | A1 | * | 11/2009 | Lacaze et al. | 701/2 |
| 2010/0198442 | A1 | * | 8/2010 | Appelman et al. | 701/25 |

OTHER PUBLICATIONS

Stoer, Josef; "Curve Fitting With Clothoidal Splines"; Jun. 2, 1982, Journal of Research of the National Bureau of Standards, vol. 87, No. 4, Jul.-Aug. 1982, pp. 317-346.*

* cited by examiner

*Primary Examiner* — Helal A Algahaim
*Assistant Examiner* — Donald J Wallace
(74) *Attorney, Agent, or Firm* — Brian F. Drazich; James M. Saunders; Charlene A. Haley (57) ABSTRACT The present invention provides an unmanned fully autonomous threat representative mobile land target for testing modern weapon systems and training personnel. The invention implements novel navigation and vehicle control algorithms which allow any predefined course to be represented spatially and temporally with continuously and smoothly varying curvatures having no discontinuities of curvature, direction, or acceleration that enable the target vehicle to traverse a predefined course with unprecedented speed, accuracy, and maneuverability without the need for communication with any remotely located station. It is emphasized that this abstract is provided to comply with the rules requiring an abstract that will allow a searcher or other reader to quickly ascertain the subject matter of the technical disclosure. It is submitted with the understanding that it will not be used to interpret or limit the scope of the claims.

6 Claims, 5 Drawing Sheets

SYSTEM AND METHOD FOR CONTROLLING A VEHICLE TRAVELING ALONG A PATH

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The present invention relates to mobile robotic vehicles capable of traversing a predefined course over terrain, or of being remotely controlled, useful for training, particularly the training of military personnel.

BACKGROUND OF THE INVENTION

Mobile land targets (MLT) used for training in the past as well as today are primarily radio controlled vehicles operated by a remote operator. They typically require the operator to monitor a video display feed from a vehicle mounted camera and to control the vehicle through manipulation of manual controls, such as a joy stick. Because of system latencies, poor video quality, and operator capability, the use of radio controlled vehicles as mobile targets severely limits their fidelity in terms of the speed and maneuverability that an individual mobile target can achieve. Other current target systems are designed to be controlled by a Control Station and use a Global Positioning System (GPS) receiver to follow or "replay" a previously recorded ground path. Such systems have similarities to the shootable remote threat ground target (SRTGT) of the present invention, but differ fundamentally in the level of integration the SRTGT has with the vehicle and in the use of multiple navigation aides such as the global positioning system (GPS), an inertial measurement unit (IMU) based inertial navigation system (INS), and wheel encoders. As more modern weapons geared towards the ability to neutralize moving targets, are nearing the end of their development cycle, threat representative targets must be available to comprehensively test weapons system performance to assure that specified performance requirements are satisfied. In addition, training of personnel in support of these new weapons and battlefield scenarios requires the use of MLTs capable of performing much better than presently remotely controlled target vehicles.

The shootable remote threat ground target system of the present invention provides threat representative mobile land targets for testing modern weapon systems as well as for training pilots, forward air controllers, ground troops, and other personnel. These targets are threat representative because their signatures in all modes can be made to very closely match the land based targets they represent and because their performance in terms of speed and maneuverability corresponds with manned vehicle capabilities. The speed, accuracy, and maneuverability of the vehicle while operating in a semi-autonomous control mode of the present invention are key features that provide significantly enhanced performance over the current state of the art systems. In addition, the use for testing and training of the mobile land targets provided by the present invention is an economic solution to the problem of providing highly representative ground targets for training to achieve better training and equipping of personnel.

SUMMARY OF THE INVENTION

The present invention provides a provides an unmanned fully autonomous threat representative mobile land target that closely matches the speed and maneuverability of actual land based targets for testing modern weapon systems and training personnel. The present invention is capable of following a predefined course with unprecedented speed, accuracy, and maneuverability without communication with any remote station.

DETAILED DESCRIPTION OF THE INVENTION

Figure 1:
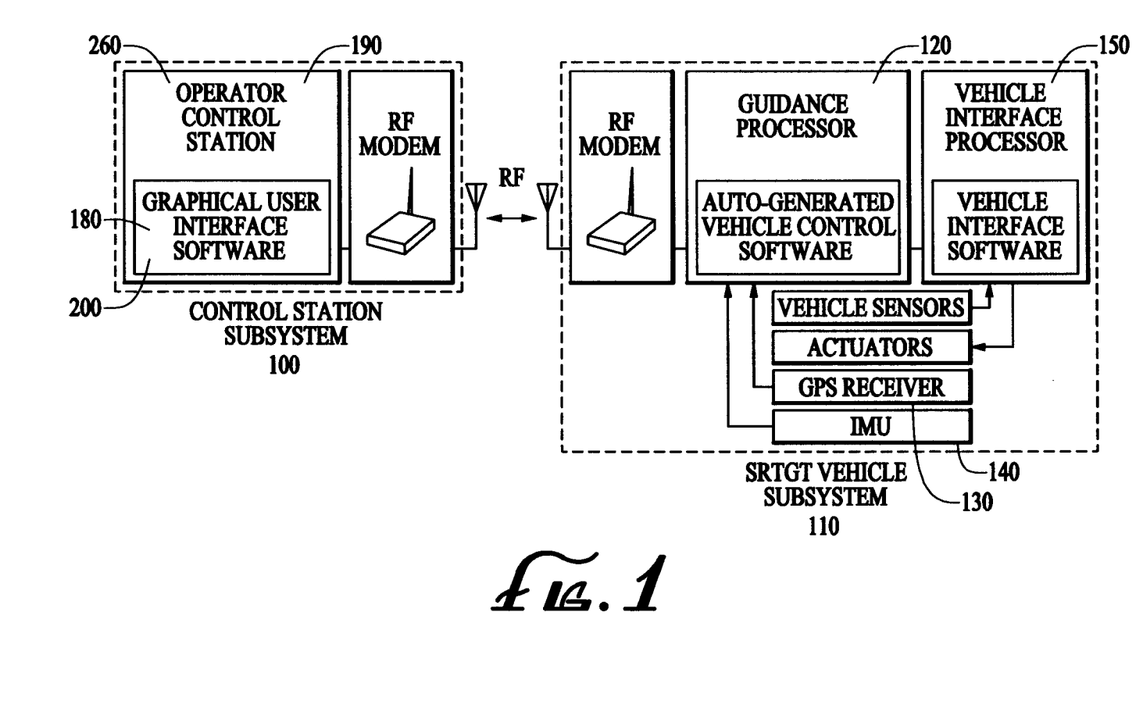
FIG. 1 of the drawings is a block diagram outlining the major functions of the control station subsystem and the vehicle subsystem.

System Architecture:

With reference to FIG. 1, the user interacts with the system via a Graphical User Interface (GUI) 180 of the Control Station Subsystem 100 to receive status information from and to send commands to the Vehicle Subsystem 110. The Control Station Subsystem 100 and the Vehicle Subsystem 110 communicate via digital radio modems to exchange data. The on board Guidance Processor 120 is adapted for high-level control of the Vehicle 210, and uses sensor inputs from a Global Positioning System (GPS) Receiver 130, and an Inertial Measurement Unit (IMU) 140, each located on board together with various vehicle-mounted sensors, to calculate commands that control the movement of various vehicle-mounted actuators.

SRTGT vehicles (i.e., Ford F-350 for example) are equipped with on board integrated components. The on board control hardware fitted to the chassis of the Vehicle 210 includes the braking actuator, transmission shifting servo, steering position linear encoder, steering servo, and wheel tachometer. In addition, on board electronic components control and/or monitor the following functions: transmission shifting, braking, wheel speed (rpm), steering, engine throttle, engine start and stop.

The embedded Guidance Processor system 120 on board the vehicle includes two integrated computer systems (i.e., a navigational computer and a vehicle control computer). The Navigational Computer 240 compares the current position and the velocity with the desired stored trajectory to determine the actuator commands necessary to cause the vehicle to follow the desired path. The Vehicle Control Computer 250 is slaved to the Navigational Computer 240 and directly interfaces with the on board sensors and control actuators. This interface between on board components allows for a fluid execution by the actuators of the commands sent from the Navigation Computer 240 and for relaying of data from the sensors to the Navigation Computer 240.

The Vehicle Interface Processor 150 is adapted to and interfaces directly with all vehicle-mounted sensors and actuators, and it communicates sensor information to the Guidance Processor 120 via a suitable data link, such as an Ethernet connection, for example. The Vehicle Interface Processor 150 also receives actuator commands from the Guidance Processor 120 and applies them to the appropriate actuator, to cause movement of the various vehicle controls, such as for example, brakes, throttle, drive train transmission shifter, steering, and two wheel drive (2WD) or four wheel drive (4WD) selection, among others.

Communication between the Control Station 190 and the Vehicle 210 is via conventional radio modems. The interface between the radio modems and the on board hardware they support is a standard Ethernet interface allowing for the use of just about any conventional communication device including hardwired Ethernet cable used for testing. Commands, status, and other information is sent between the Control Station 190 and the target Vehicle 210 using the Industry Standard JAUS protocol. Custom messages to facilitate SRTGT unique capabilities were added to the JAUS protocol including the sending of Real Time Kinematic (RTK) corrections. An RTK base or reference station sends real-time corrections to the Control Station 190 which in turn sends the real-time corrections to the Vehicle 210. RTK corrections are used by the GPS receiver to provide high fidelity position data with centimeter level of accuracy based on the use of carrier phase measurements of the GPS.

The Control Station 190 of the present invention is implemented on a computer, preferably a Windows-based laptop computer. The software for which was originally developed by the Department of the Army, and was modified to work with the present SRTGT target vehicle. The Control Station 190 provides the control station operator a "bird's-eye" view of the area of interest. For example, the Control Station computer display preferably displays an icon of the target vehicle together with the path that is currently loaded to the vehicle's Navigation Computer 240 for autonomous control. The Control Station operator may upload to the target Vehicle 210 any path stored in the Control Station 190 computer database, select and set a speed for the target Vehicle 210 to drive, start and stop the vehicle, and modify any of several safety thresholds for operation of the vehicle. The Control Station operator also has the ability to directly control the driving of the target Vehicle 210 by means of an input device such as a joystick or a standard game pad, but such operation is limited to when the operator has a direct view of the vehicle, as there are no cameras mounted on the vehicle itself. The operator has controls for the brakes, throttle, steering, and gear selection. The intent of this remote operation mode is not to drive a vehicle through a target area, but instead to provide the capacity to move the Vehicle 210 short distances while under the direct supervision of the operator.

The Control Station 190 communicates with the target Vehicle 210 over an RF modem link, which has a straight-line unobstructed range of approximately 6 miles. The RF modem is connected to the Control Station Computer 260 via an Ethernet link, which allows communication to the vehicle using standard UDP messages. Therefore, it is completely transparent to the Control Station 190 whether its communications to the target Vehicle 210 are over the RF modems or whether it is connected directly to the target Vehicle 210 such as by means of a standard CAT-5 Ethernet cable.

A second Ethernet port is provided to connect the Control Station 190 to an external station, such as a target/test range control center, in order to provide target Vehicle 210 position and velocity information during a test. The Control Station Computer 260 auto-detects the connection to the external station and if a connection is made, the Control Station 190 will provide target Vehicle 210 position and velocity information. Finally, the Control Station Computer 260 is connected to a Control Station GPS Receiver 270 (not shown), preferably a NovAtel GPS Receiver. The Control Station GPS Receiver 270 (not shown) is configured to act as a stationary base station, and to provide GPS error corrections to the target Vehicle 210. These corrections are collected by the Control Station 190, and sent to the target Vehicle 210 over the RF link. The vehicle's Navigation Computer 240 then passes these corrections to its mobile GPS Receiver 130, resulting in position error estimates decreasing to as small as 1 inch when using the RTK.

The vehicle itself has been designed to be autonomously controlled. The intent is that an operator would drive the vehicle through a target area, and record the path that the vehicle drives. Once this path has been recorded, it is converted and logged into the Control Station's 190 database. At any time, the path can be uploaded to a vehicle, and the vehicle can then be commanded to autonomously drive the path itself. Since the predefined paths are based upon specific GPS coordinates, they are sensitive to the location where recorded. For example, a path recorded in California could not be played back in Arizona, as the geographic locations are not the same.

In one embodiment, the SRTGT Control Station 190 is a laptop computer equipped with enhanced features and a joystick controller. During testing of the Vehicle 210, the Control Station 190 maintains a supervisory level control of the Vehicle 210. Supervisory level control means that the Vehicle 210 is free to navigate using it's on board systems and the information stored on board (autonomously) while the Control Station 190 monitors its progress, intervening only when required. The Graphical User Interface (GUI) 180 between the control station operator and the Control Station 190 is provided by the enhanced Target Vehicle Array Remote Control System (TVARCS) software.

Figure 2:
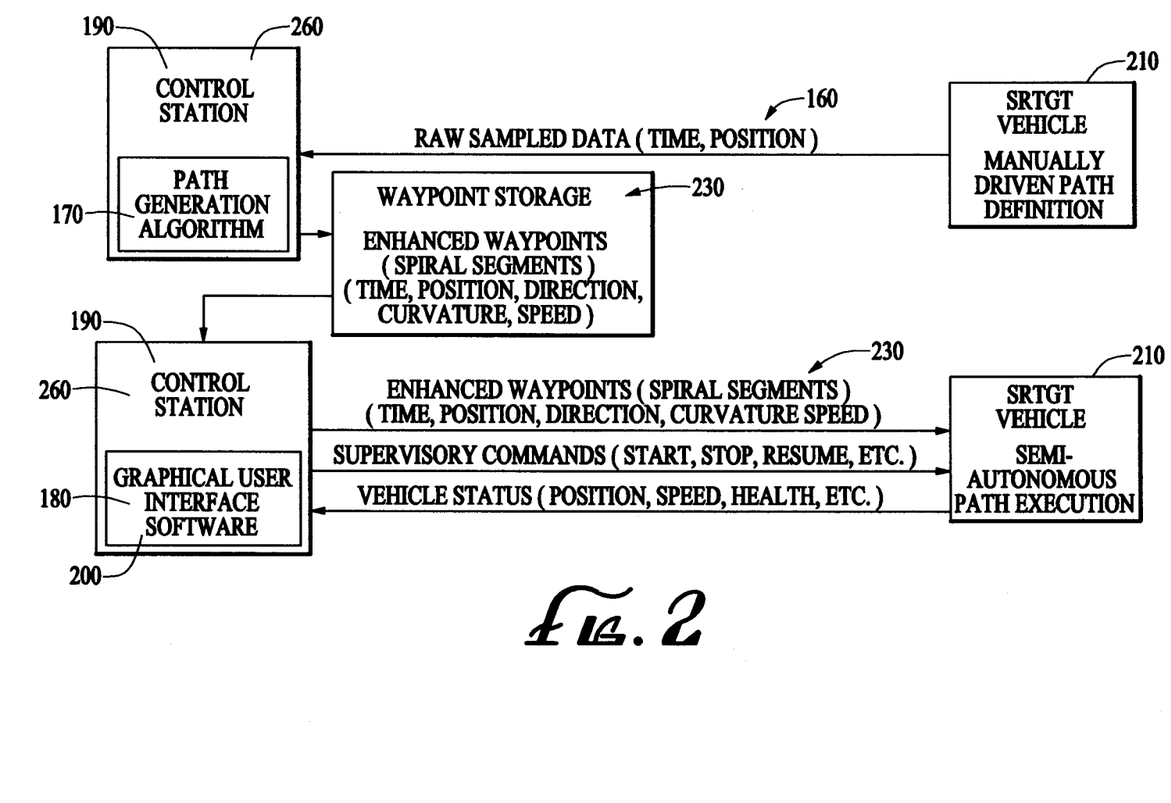
FIG. 2 of the drawings is a block diagram showing the major functions of and flow of information between the control station subsystem and the vehicle subsystem.
Figures 3, 3A:
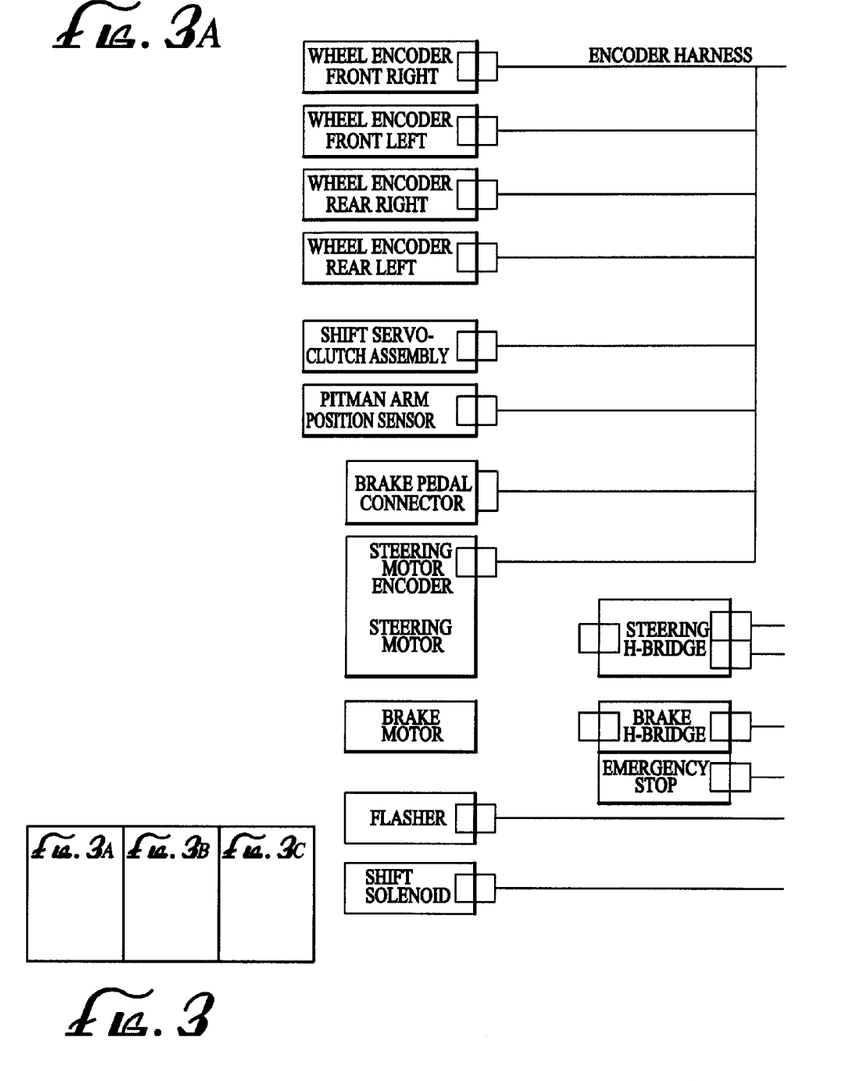
FIG. 3 of the drawings is a diagram outlining a possible embodiment of the Vehicle Subsystem electrical plan (exclusive of the vehicle's original electrical system).
Figure 3B:
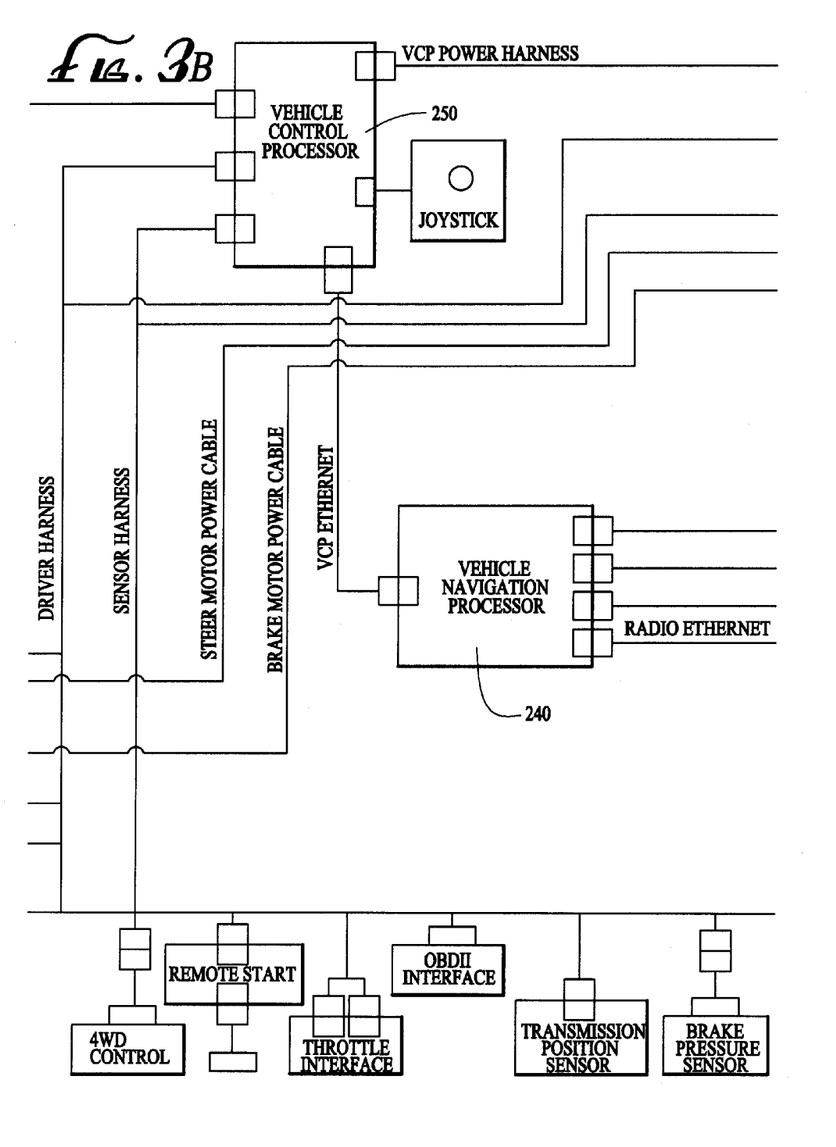
Figure 3C:
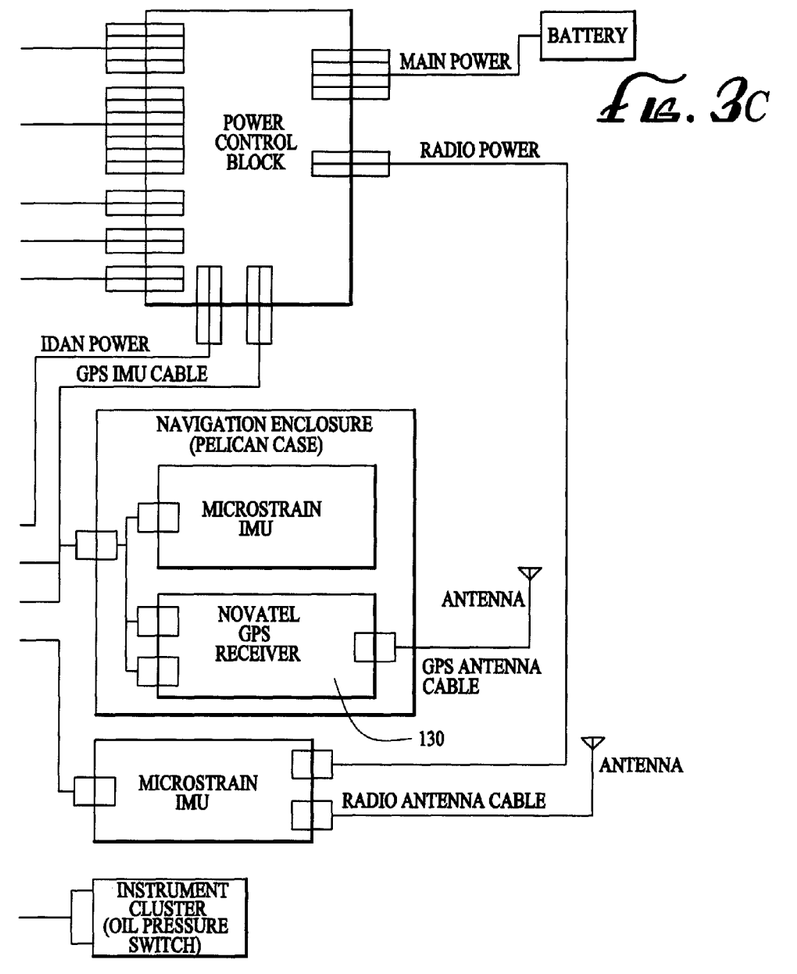

Path Definition Process:

With reference to FIG. 2, the SRTGT system requires a predefined course or ground path in order to be operated in the semi-autonomous control mode. A preferred process for creating such predefined courses or paths is outlined as follows.

(1) Raw GPS Data 160 generated by the on board GPS Receiver 130 during a manually operated traverse of the Vehicle 210 over the desired ground path is logged/stored to a file of the Guidance Processor 120.

(2) The GPS Data 160 is input to a Path Generation Algorithm 170, preferably implemented in the Control Station Computer 260, which uses nonlinear curve fitting algorithms to match spiral path segments to the GPS Data 160. Optionally, the Path Generation Algorithm 170, may be implemented in the Guidance Processor system 120.

(3) The spiral path segments thus determined are converted to Enhanced Waypoints 230 (waypoints with additional geometric and speed data, for example) and are saved in a waypoint file or database for subsequent retrieval.

The spiral form (variable and continuous curvature without discontinuities of curvature or direction) of the path segments is a unique feature of the present invention that is a key capability of the present invention enabling the improved speed, path accuracy and vehicle maneuverability achieved by the present invention compared to current state of the art systems. Rather, current state of the art systems typically use waypoints (position only—discrete points), or arcs (lines of constant curvature with discontinuous curvature between line segments), or straight lines (lines of zero curvature with discontinuous direction between line segments) for path definition.

Path Execution Process:

With further reference to FIG. 2, when it is desired for the system to operate in the fully autonomous mode as an unmanned target Vehicle 210, the operational sequence may be outlined as follows.

(1) The previously generated and stored Enhanced Waypoints 230 are retrieved and transmitted by the Control Station 190 to the unmanned vehicle's Guidance Processor system 120 in preparation for execution.

(2) The user/operator transmits a "start" command via the Graphical User Interface (GUI) 180 of the Control Station 190.

(3) The Vehicle 210 semi-autonomously (autonomously, except for optional discrete operator commands) drives the same path geometry and speed profile as was recorded in the retrieved file during the manually driven path definition process described herein. In this mode, the only user interaction is to optionally send a "stop" command, and then optionally a "resume" command. The user may also specify a maximum speed if it is desired to limit the speed to something other than what was recorded during the path definition process. The specified maximum speed may be less than, equal to, or greater than the speed that was recorded during the manually driven path definition process. Further, the specified maximum speed may be set to different values over different portions of the recorded predefined path.

(4) The Control Station Graphical User Interface Software 200 receives status information including position, speed, and vehicle health input in real time from the Guidance Processor 120 and provides the information in real time to the Control Station 190 for possible analysis and/or display.

(5) Once the Vehicle 210 has traversed the recorded predefined path, it autonomously comes to a stop, shifts the drive train transmission into the parking gear mode, and awaits further commands.

With respect to FIG. 2, the spiral form of the Path Generation Algorithm 170 allows the entire vehicle course or path to be represented with continuously and smoothly varying curvatures having no discontinuities of curvature or direction. This capability of the present invention thus eliminates the inclusion in the vehicle path of un-drivable discontinuities that are typical of paths represented with arcs and/or straight lines. The form of spiral used in the present SRTGT path definition process is a Clothoid, which is characterized by linearly changing curvature as a function of path length. This property makes it useful as a transition curve in highway engineering because a vehicle following the curve at a constant speed will experience a constant rate of angular acceleration. This characteristic is ideally suited to vehicles having a limited ability to change the rate of turn, as is the case with all wheeled vehicles due to the finite maximum rate of steering actuation. Tracked and semi-tracked vehicles also benefit from the continuous curvature characteristics of spiral paths, as they cannot instantaneously change turn rate either.

The Path Generation Process involves two stages. In the first stage, preferably implemented in the Control Station Computer 260, the GPS Data 160 is transformed into a local North-East-Down Cartesian coordinate system and is fitted with spiral path segments without regard for timing and velocity information. This is accomplished by matching the North and East coordinates with a simultaneous 2-segment piecewise least-squares fit of spiral segments. After each pair of spiral segments is fit, only the first such segment is retained as a solution, while its end position, direction, and curvature are used as the initial conditions for the next pair of spirals to be fit to the next group of raw GPS Data points 160. The use of a simultaneous 2-segment curve fit, with only the first retained for each fit cycle is critical, since the curve fit process for the path quickly becomes geometrically unstable if only one segment is fit at a time without considering the impact of its endpoint conditions on the subsequent spiral segment that is to follow. When the two spiral segments are fit simultaneously, with the position of the second always a function of the endpoint of the first, then the natural result is that the solution for the first segment's geometry always is balanced to provide both the best representation of the raw data for the first segment, and the best initial conditions for the next spiral segment. Further, and very significantly, useful geometric information about the direction, curvature, and rate of change in curvature (i.e., sharpness of turns) of the path is available from the resulting spirals. The availability of such information enables the use in the present invention of advanced path-following control algorithms, which utilize the rate of change of curvature of the path to determine the required steering motion in time to compensate for latency in steering actuator response.

The second stage, preferably implemented in the on board Guidance Processor system 120, of the path generation process is calculation of the time of arrival and path length at each point along the fitted spirals and performing a least-squares fit to find the piecewise-constant acceleration that will provide the best fit. This means that the commanded velocity of the resulting path will not abruptly change but will be a gradual acceleration of deceleration similar to the original maneuvering of the Vehicle 210 over the manually driven course. Smoothed information about the path length, velocity, and acceleration at any given time is available from the resulting best fit. This timing and velocity information is used during path execution by the speed control algorithm implemented in the Guidance Processor system 120 to match the velocity profile and to maintain synchronization of the target Vehicle 210 with the originally driven path.

The Clothoid family of spirals can be parameterized by initial conditions for position, direction, and curvature, followed by a sharpness parameter (k), which represents the rate of change of curvature as a function of path length, measured in radians per meter per meter (rad/m/m), and a length parameter (s) in meters of path length. Naturally, other consistent systems of measurement may be used to parameterize position, direction, and curvature, and are within the scope of the present invention. For the speed profile of each segment, given the initial speed at the start of each segment, the speed profile along the segment is defined by an acceleration parameter (a). The spirals are stored as enhanced waypoints 230, which include the following fields relative to an absolute origin for the whole path: x=position (meters north of origin); y=position (meters east of origin); dir=direction (radians clockwise from north); c=curvature (radians/meter of path length); v=along-path speed (meters/second); and, t=time of arrival (seconds).

The Enhanced Waypoints 230 are sent from the Control Station Computer 260 to the vehicle's Guidance Processor system 120 as a path, after which they must be reconstructed into spirals in order to be driven by the Vehicle 210. The relationships for extracting length (s), sharpness (k), and acceleration (a) for any pair of enhanced waypoints, where the symbols with a 0 subscript suffix (i.e., $x_0$) denote those associated with the second waypoint, is:

Length, $s$: $s = 2*(dir - dir_0)/(c + c_0)$

Sharpness, $k$: $k = (c - c_0)/s$

Acceleration, $a$: $a = (v - v_0)/(t - t_0)$

These are used in the algorithms for following the path and for finding the unique x, y, dir, c, v and time values at any intermediate point between waypoints.

The smooth and accurate curve fit resulting from this novel path generation process enables new performance limits to be achieved with the present invention. For example, an embodiment of the SRTGT system of the present invention has been demonstrated to be able to drive semi-autonomously at speeds of up to 76 mph while maintaining cross-track errors of less than about 6 inches, and at 91 mph with cross-track errors less than about 12 inches. Additionally, at speeds of 30 mph, the SRTGT systems is capable of controlling a tracked, semi-tracked, or wheeled vehicle such as, for example, a small pickup truck (e.g., Chevrolet S-10) or full-size pickup truck (e.g., Ford F-350) or similar, with lateral acceleration of 0.6 g's.

Further with respect to FIG. 2, the system operates under supervisory control, which means that only discrete commands (such as, for example, "start", "stop" and "resume") are required to be sent to the vehicle during semi-autonomous operation. Most preferably all waypoint data for the entire path is sent to and stored aboard the Vehicle 210 before it is set in motion along the path. Significantly, all communication that is critical for accurate real-time performance is confined entirely to inter-component communication on board the Vehicle 210 itself. There is no requirement for communication between the Control Station Subsystem 100 and the Vehicle Subsystem 110 during autonomous or semi-autonomous operation of the Vehicle 210 over the predefined path. This key feature enables higher levels of speed, maneuverability, and system accuracy to be achieved. Existing prior art systems depend on real-time communication between the vehicle subsystem and the remotely located control station via a radio link. Such remote control arrangements degrade control performance as a result of system latencies and render such systems susceptible to performance loss due to radio signal interference. With the supervisory control architecture of the present invention there is no effect on system performance or accuracy when radio communication between the Vehicle 210 and the Control Station 190 is degraded.

With respect to FIG. 1, self-calibration, guidance processor, vehicle sensors and actuators are described. The present SRTGT control system uniquely provides that its various sensors discern information about its own geometry, actuator dynamics and position, as well as throttle and brake performance and position, without requiring any user/operator input or assistance. Rather, this information is stored on board in a calibration file or database which contains actuator calibration data including steering calibration, brake and throttle calibration, transmission selector calibration, and wheel position calibration. The calibration database is accessed by the vehicle control software implemented on the Guidance Processor 120 as shown in FIG. 1. The steering control algorithm uses the steering calibration information to predict the appropriate steering position command that will yield a given desired turn rate. The speed control algorithm uses the brake and throttle calibration data to predict the brake and/or throttle commands, respectively, necessary to achieve a given desired longitudinal acceleration. These predictions are updated or adjusted based on real-time measurements of actual performance, and result in dramatically reduced uncorrected error compared to control algorithms that depend entirely on measured feedback. Such a-priori knowledge of the vehicle model is key to enabling the unprecedented speed, accuracy, and maneuverability of the present SRTGT control system.

In one embodiment the self-calibration is performed in three automatic procedures that are initiated by an operator. Once initiated, the vehicle control system completes each self-calibration procedure without requiring any additional input from the operator. Calculations are performed by the Guidance Processor 120 using measurement data from the GPS, IMU, wheel rotation sensors, and steering linkage sensor (FIG. 1).

1. Steering Calibration Procedure:

Simultaneous estimation of steering calibration parameters, Wheel radii (4 wheels), Wheelbase, and Track width. The system uses sensors mounted on each wheel of the Vehicle 210 to first determine effective wheel radii for each wheel independently by comparing GPS velocity data with each wheel's sensed rotation rate while driving in a straight line for a sufficient distance to acquire required data, typically about 10 meters. At this point, the radius of each wheel is determined and is used to measure the relative wheel speeds while turning at the minimum turn radius. The wheel speeds in turn are used to simultaneously calculate wheelbase and track width information based on the theoretical kinematics of a wheeled vehicle with steerable front wheels. After 1.5 full turns (1.5 circles), the vehicle drives straight for about 10 meters, then repeats the procedure in the opposite turning direction so that the steering can be calibrated in the opposite direction at the minimum turning radius (sharpest turn). The Wheelbase and Track width estimates from each turn direction are averaged. The final steering calibration curve is the result of a least-squares fit of a quadratic curve to the three data points resulting from the measurements of the straight segments and the two turns. The resulting quadratic curve relates raw steering sensor data or counts to the actual steering angle at the front kingpins. A tricycle model is used to create the reference steering angles in radians based on known (simultaneously estimated) wheelbase and measured GPS velocity and IMU-measured yaw rates. The estimates are calculated in real time by collecting sampled data during the maneuvers and recursively averaging raw measurements to produce the final estimation. Typical variations in results are within 1 cm for Wheelbase and track width values, 2 mm for wheel radii, and 0.1 degrees for steering angle.

2. Brake and Drag Calibration Procedure:

Preferably, the vehicle is accelerated to about 5 mph, and shifted to Neutral gear while measuring the vehicle's deceleration until it is nearly stopped. This is repeated at 30 mph. The deceleration at the two speed points, along with zero slope constraint at 0 mph (stopped), are used to define a quadratic curve for aerodynamic drag as a function of speed. After drag is known, the process is repeated at 30 mph with varying predefined brake commands, until deceleration data has been collected for the full range of brake movement. The mass of the vehicle is defined by the operator/user, and is used to convert measured acceleration data into measured longitudinal force for each predefined brake command. The result is a linearly interpolated table that maps longitudinal deceleration forces to brake positions for use in the control of the vehicle.

3. Throttle Calibration Procedure:

With the brake forces known, the system next applies a series of predefined throttle commands while using the brake to control speed to near 1 mph. For each throttle command, the average brake force is used to imply the force applied by the given throttle command. This information is used to build a table of static forces vs. throttle command. Next, the procedure is repeated at 30 mph, which, when combined with average speed measurements, yields a table of measured power vs. throttle command. The resulting table is interpolated for speed using a constant-power curve that transitions to a quadratic curve near the zero speed point (since the constant power curve is infinite at that point and does not accurately reflect the power lost in the transmission at low speeds). This interpolated prediction of force as a function of speed and throttle command is used by the Guidance Processor 120 to calculate the predicted throttle command required for a given desired acceleration.

Using these throttle and brake models the SRTGT control system is able to maintain speed accuracy within 0.5 mph while driving at 70 mph on a road with changes in incline, over a 3 second time interval (i.e., about 300 feet), of up to 4% in grade.

While the present invention has been described in connection with what are currently considered to be the most practical and preferred embodiments, it is to be understood that the invention is not to be, limited to the disclosed embodiments, but to the contrary, is intended to cover various modifications, embodiments, and equivalent processes included within the spirit of the invention as may be suggested by the teachings herein, which are set forth in the appended claims, and which scope is to be accorded the broadest interpretation so as to encompass all such modifications, embodiments, and equivalent processes.

What is claimed is:

1. A mobile target vehicle traveling along a path, comprising:
    a motor vehicle arranged to traverse terrain including an engine, engine throttle system, drive train system, braking system, and steering system;
    the motor vehicle including actuators arranged to position controls of the braking system, steering system, drive train system, and engine throttle system in response to commands from an onboard vehicle control computer;
    the motor vehicle including sensors arranged to sense the position of controls for the braking system, steering system, drive train system, and engine throttle system;
    said sensors arranged to relay the position of controls of the braking system, steering system, drive train system, and engine throttle system to said vehicle control computer;
    a navigation computer disposed onboard the motor vehicle;
    a global positioning system receiver disposed onboard the motor vehicle arranged to provide motor vehicle position information to said navigation computer;
    information representative of a recorded predefined path, wherein said recorded predefined path is a previously driven manually operated traverse of the motor vehicle over the desired vehicle ground path, wherein said information is a plurality of data points based upon specific GPS coordinates stored in said navigation computer as enhanced waypoints derived from continuously and smoothly varying curvatures of a simultaneous two-segment piecewise least-squares fit of a clothoid spiral form having no discontinuities of curvature or direction;
    wherein said information representative of a recorded predefined path is matched by calculating time of arrival and path length at each point in said plurality of data points along said simultaneous two-segment piecewise least-squares fit of said clothoid spiral form, said least-squares fit having corresponding path length, velocity, and acceleration information at any given time, wherein said time of arrival and said velocity information is used to match the velocity profile and maintain synchronization of the motor vehicle along said predefined path;
    said navigation computer operably linked with said vehicle control computer;
    said navigation computer operative upon said stored information representative of a recorded predefined path and said motor vehicle position information to determine and to send to said vehicle control computer the actuator commands necessary to cause the motor vehicle to follow said predefined path; and
    said vehicle control computer arranged to cause execution by the actuators of the commands sent from the navigation computer to cause the motor vehicle to follow said recorded predefined path.

2. The target vehicle of claim 1 wherein the motor vehicle is selected from the group of motor vehicles consisting of a wheeled vehicle, a tracked vehicle, and a semi-tracked vehicle.

3. The target vehicle of claim 1 wherein the self-contained on board systems are configured to operate the vehicle over a recorded predefined path at a speed up to about 75 mph while maintaining cross-track errors no greater than about 6 inches.

4. The target vehicle of claim 1 wherein the self-contained on board systems are configured to operate the vehicle over a recorded predefined path at a speed of about 30 mph with lateral acceleration up to about 0.6 g's.

5. The target vehicle of claim 1 wherein the self-contained on board systems are configured to operate the vehicle with a speed accuracy within 0.5 mph while driving at up to 70 mph on a road with changes in incline, over a 3 second time interval, of up to 4% in grade.

6. The target vehicle of claim 1 further including an inertial measurement unit disposed onboard the motor vehicle configured to provide motor vehicle position information to said navigation computer.

* * * * *